(12) United States Patent
Pearson et al.

(10) Patent No.: US 10,450,957 B2
(45) Date of Patent: Oct. 22, 2019

(54) GAS TURBINE ENGINE WITH HEAT PIPE SYSTEM

(71) Applicant: United Technologies Corporation, Farmington, CT (US)

(72) Inventors: Matthew Robert Pearson, Hartford, CT (US); Gabriel L. Suciu, Glastonbury, CT (US); Justin R. Urban, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 215 days.

(21) Appl. No.: 15/412,203

(22) Filed: Jan. 23, 2017

(65) Prior Publication Data
US 2018/0209342 A1 Jul. 26, 2018

(51) Int. Cl.
F01D 25/12 (2006.01)
F02C 7/04 (2006.01)
(Continued)

(52) U.S. Cl.
CPC .................. F02C 7/12 (2013.01); F01D 5/08 (2013.01); F01D 21/00 (2013.01); F01D 25/10 (2013.01);
(Continued)

(58) Field of Classification Search
CPC ...... F05D 2260/2018; F02C 7/12; F02C 3/04; F01D 5/08; F01D 21/00; F01D 25/00;
(Continued)

(56) References Cited

U.S. PATENT DOCUMENTS 2,499,832 A * 3/1950 Palmatier ............... B64D 15/02
165/235
2,712,727 A * 7/1955 Morley ................... F02C 7/047
244/134 R
(Continued)

FOREIGN PATENT DOCUMENTS

CN 104121037 B 7/2015
GB 2117842 10/1983
(Continued)

OTHER PUBLICATIONS

EP Search Report for Application No. 18153069.2-1006; dated Nov. 16, 2018; 5 pages.

Primary Examiner — Todd E Manahan
Assistant Examiner — Eric W Linderman
(74) Attorney, Agent, or Firm — Cantor Colburn LLP

(57) ABSTRACT

A gas turbine engine includes a rotor section proximate to a combustor section, where the rotor section is subject to bowing effects due to thermal differences and heat transfer at engine shutdown. The gas turbine engine also includes a heat pipe system. The heat pipe system includes one or more heat pipes installed between an upper portion of the rotor section and a lower portion of the rotor section. The heat pipe system is operable to accept heat at a hot side of the heat pipe system at the upper portion, flow heat from the hot side to a cold side of the heat pipe system, and reject heat from the cold side of the heat pipe system at the lower portion to reduce a thermal differential between the upper portion and the lower portion at engine shutdown.

12 Claims, 7 Drawing Sheets

(51) Int. Cl.
| | |
|---|---|
| *F02C 7/12* | (2006.01) |
| *F02C 7/14* | (2006.01) |
| *F02C 3/04* | (2006.01) |
| *F28D 15/02* | (2006.01) |
| *F01D 5/08* | (2006.01) |
| *F01D 21/00* | (2006.01) |
| *F01D 25/10* | (2006.01) |
| *F28D 15/04* | (2006.01) |
| *F28D 21/00* | (2006.01) |

(52) U.S. Cl.
CPC ............... *F01D 25/12* (2013.01); *F02C 3/04* (2013.01); *F28D 15/0208* (2013.01); *F28D 15/0233* (2013.01); *F28D 15/0266* (2013.01); *F28D 15/0275* (2013.01); *F02C 7/14* (2013.01); *F05D 2260/208* (2013.01); *F28D 15/04* (2013.01); *F28D 2021/0026* (2013.01); *Y02T 50/676* (2013.01)

(58) Field of Classification Search
CPC .. F01D 25/12; F01D 15/0233; F01D 15/0266; F01D 15/0275
See application file for complete search history.

(56) References Cited

U.S. PATENT DOCUMENTS

| | | | | |
|---|---|---|---|---|
| 3,355,883 | A * | 12/1967 | Beam, Jr. | F01D 5/088 165/104.28 |
| 3,429,122 | A * | 2/1969 | Pravda | F01D 5/181 165/104.26 |
| 3,751,909 | A * | 8/1973 | Kohler | F01D 5/148 415/115 |
| 3,999,400 | A * | 12/1976 | Gray | F01D 5/088 62/115 |
| 4,207,027 | A * | 6/1980 | Barry | F01D 5/181 165/104.26 |
| 4,240,257 | A * | 12/1980 | Rakowsky | F01K 9/026 165/104.26 |
| 4,738,416 | A * | 4/1988 | Birbragher | B64D 15/04 244/134 B |
| 4,782,658 | A * | 11/1988 | Perry | F02C 7/047 60/226.1 |
| 4,921,041 | A * | 5/1990 | Akachi | F28D 15/00 165/104.14 |
| 5,178,514 | A * | 1/1993 | Damiral | F01D 11/08 415/114 |
| 5,192,186 | A * | 3/1993 | Sadler | F01D 11/18 415/177 |
| 5,267,831 | A * | 12/1993 | Damiral | F01D 11/18 415/114 |
| 5,439,351 | A * | 8/1995 | Artt | F01D 5/185 165/104.26 |
| 5,639,210 | A * | 6/1997 | Carpenter | F01D 11/18 415/135 |
| 6,179,557 | B1 * | 1/2001 | Dodd | F01D 9/00 415/108 |
| 6,510,684 | B2 * | 1/2003 | Matsunaga | F02C 3/05 415/114 |
| 6,584,778 | B1 * | 7/2003 | Griffiths | F02C 7/14 60/226.1 |
| 7,114,915 | B2 * | 10/2006 | Uematsu | F01D 5/084 415/115 |
| 7,144,915 | B2 | 10/2006 | Uematsu et al. | |
| 8,307,654 | B1 * | 11/2012 | Liang | F01D 9/023 60/39.37 |
| 8,387,362 | B2 * | 3/2013 | Storage | F01D 25/125 60/226.1 |
| 9,212,623 | B2 * | 12/2015 | Murphy | F02K 1/46 |
| 9,331,552 | B2 * | 5/2016 | Fedoseyev | H02K 9/20 |
| 9,334,803 | B2 * | 5/2016 | Intile | F02C 7/12 |
| 9,797,310 | B2 * | 10/2017 | Ekanayake | F01K 23/02 |
| 9,945,250 | B2 * | 4/2018 | Kitamura | F01D 11/24 |
| 10,006,369 | B2 * | 6/2018 | Kupiszewski | F02C 3/04 |
| 2005/0050877 | A1 * | 3/2005 | Venkataramani | F02C 7/047 60/39.093 |
| 2007/0017208 | A1 * | 1/2007 | Ralls, Jr. | F02C 1/04 60/39.511 |
| 2007/0065274 | A1 * | 3/2007 | Birrell | F01D 25/14 415/116 |
| 2007/0234704 | A1 * | 10/2007 | Moniz | F01D 25/02 60/39.093 |
| 2008/0053099 | A1 * | 3/2008 | Venkataramani | F01D 25/12 60/772 |
| 2008/0053100 | A1 * | 3/2008 | Venkataramani | F02C 7/047 60/772 |
| 2008/0159852 | A1 * | 7/2008 | Stephenson | F01D 5/046 415/178 |
| 2008/0314019 | A1 * | 12/2008 | Siebert | B64D 29/00 60/266 |
| 2009/0120099 | A1 * | 5/2009 | Brand | F01D 25/02 60/785 |
| 2010/0011738 | A1 * | 1/2010 | Zhang | F01D 25/12 60/39.5 |
| 2010/0236215 | A1 * | 9/2010 | Venkataramani | F01D 9/065 60/39.093 |
| 2010/0236217 | A1 * | 9/2010 | Venkataramani | F01D 9/06 60/266 |
| 2010/0236759 | A1 * | 9/2010 | Wadley | E04C 2/34 165/104.19 |
| 2011/0100020 | A1 * | 5/2011 | Zhang | F01D 5/185 60/806 |
| 2011/0103939 | A1 * | 5/2011 | Zhang | F01D 11/18 415/173.2 |
| 2011/0302928 | A1 * | 12/2011 | Mudawar | F02C 7/224 60/782 |
| 2013/0186102 | A1 * | 7/2013 | Lo | F02C 7/18 60/785 |
| 2013/0236299 | A1 * | 9/2013 | Kington | F02C 7/10 415/177 |
| 2014/0165570 | A1 * | 6/2014 | Herring | F02C 7/14 60/730 |
| 2014/0205447 | A1 * | 7/2014 | Patat | F01D 9/065 415/177 |
| 2016/0108756 | A1 * | 4/2016 | Farkas | F01D 11/24 415/1 |
| 2016/0305279 | A1 * | 10/2016 | Gerstler | F01D 9/041 |
| 2017/0159566 | A1 * | 6/2017 | Sennoun | F02C 3/04 |
| 2017/0184026 | A1 * | 6/2017 | Elbibary | F02C 7/12 |
| 2017/0198637 | A1 * | 7/2017 | Cerny | F02C 7/185 |
| 2017/0198638 | A1 * | 7/2017 | Cerny | F28F 9/02 |
| 2017/0198719 | A1 * | 7/2017 | Cerny | B21J 22/02 |
| 2017/0198974 | A1 * | 7/2017 | Cerny | F02C 7/185 |
| 2017/0363004 | A1 * | 12/2017 | Xu | F02C 7/12 |
| 2018/0023416 | A1 * | 1/2018 | Riaz | F01D 17/145 415/1 |
| 2018/0023475 | A1 * | 1/2018 | Xu | F01D 9/065 60/806 |
| 2018/0058259 | A1 * | 3/2018 | Sharma | F28D 15/0233 |
| 2018/0066537 | A1 * | 3/2018 | Radomski | F02C 7/047 |
| 2018/0179896 | A1 * | 6/2018 | Pal | F01D 5/085 |
| 2018/0274387 | A1 * | 9/2018 | Hartshorn | F01D 5/02 |
| 2018/0306059 | A1 * | 10/2018 | Ranjan | F01D 25/14 |
| 2018/0306060 | A1 * | 10/2018 | Ranjan | F01D 25/14 |

FOREIGN PATENT DOCUMENTS

| | | |
|---|---|---|
| JP | H11117810 | 4/1999 |
| WO | 2006102761 A1 | 10/2006 |

* cited by examiner

GAS TURBINE ENGINE WITH HEAT PIPE SYSTEM

BACKGROUND

This disclosure relates to gas turbine engines, and more particularly to an apparatus, system and method for bowed rotor avoidance in gas turbine engines using a heat pipe system.

Gas turbine engines are used in numerous applications, one of which is for providing thrust to an airplane. When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine which can result in a "bowed rotor" condition. If a gas turbine engine is in such a bowed rotor condition, it is undesirable to restart or start the engine.

One approach to mitigating a bowed rotor condition is to use a starter system to drive rotation (i.e., cool-down motoring) of a spool within the engine for an extended period of time at a slow speed. This process can delay engine starting and may lead to premature starter system wear. Other approaches to engine rotation to alleviate a bowed rotor condition have been contemplated, but such approaches can also delay engine starting and/or require use of an energy source.

BRIEF DESCRIPTION

In an embodiment, a gas turbine engine includes a rotor section proximate to a combustor section, where the rotor section is subject to bowing effects due to thermal differences and heat transfer at engine shutdown. The gas turbine engine also includes a heat pipe system. The heat pipe system includes one or more heat pipes installed between an upper portion of the rotor section and a lower portion of the rotor section. The heat pipe system is operable to accept heat at a hot side of the heat pipe system at the upper portion, flow heat from the hot side to a cold side of the heat pipe system, and reject heat from the cold side of the heat pipe system at the lower portion to reduce a thermal differential between the upper portion and the lower portion at engine shutdown.

In addition to one or more of the features described above, or as an alternative to any of the foregoing embodiments, further embodiments may include a compressor section and a turbine section proximate to the combustor section, where the rotor section includes a portion of a high pressure compressor of the compressor section proximate to the combustor section.

In addition to one or more of the features described above, or as an alternative to any of the foregoing embodiments, further embodiments may include where at least one of the one or more heat pipes is coupled to a casing of the gas turbine engine.

In addition to one or more of the features described above, or as an alternative to any of the foregoing embodiments, further embodiments may include where the at least one of the one or more heat pipes that is coupled to the casing of the gas turbine engine spans an outer diameter of the casing between the upper portion and the lower portion.

In addition to one or more of the features described above, or as an alternative to any of the foregoing embodiments, further embodiments may include where at least one of the one or more heat pipes passes through an interior portion of the rotor section.

In addition to one or more of the features described above, or as an alternative to any of the foregoing embodiments, further embodiments may include where the at least one of the one or more heat pipes is installed in a rotating component of the interior portion.

In addition to one or more of the features described above, or as an alternative to any of the foregoing embodiments, further embodiments may include where the at least one of the one or more heat pipes is installed in a non-rotating component of the interior portion.

In addition to one or more of the features described above, or as an alternative to any of the foregoing embodiments, further embodiments may include where at least one of the one or more heat pipes is coupled to a casing that surrounds the rotor section and spans an outer diameter of the casing between the upper portion and the lower portion, and at least one of the one or more heat pipes passes through an interior portion of the rotor section.

In addition to one or more of the features described above, or as an alternative to any of the foregoing embodiments, further embodiments may include where the at least one of the one or more heat pipes that passes through the interior portion of the rotor section comprises at least one heat pipe installed in a rotating component of the interior portion and at least one heat pipe installed in a non-rotating component of the interior portion.

In addition to one or more of the features described above, or as an alternative to any of the foregoing embodiments, further embodiments may include where at least one of the one or more heat pipes is installed in a rotating component of an interior portion of the rotor section and at least one of the one or more heat pipes is installed in a non-rotating component of the interior portion.

According to an embodiment, a method for bowed rotor avoidance in a gas turbine engine is provided. The method includes accepting heat at a hot side of a heat pipe system at an upper portion of a rotor section of a gas turbine engine, the rotor section subject to bowing effects due to thermal differences at engine shutdown, wherein the heat pipe system comprises one or more heat pipes. Heat flows from the hot side of the heat pipe system to a cold side of the heat pipe system. Heat is rejected from the cold side of the heat pipe system at a lower portion of the rotor section of the gas turbine engine to reduce a thermal differential and heat transfer between the upper portion and the lower portion at engine shutdown.

A technical effect of the apparatus, systems and methods is achieved by using a heat pipe system in a gas turbine engine for bowed rotor avoidance as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures. Embodiments incorporate a heat pipe system including one or more heat pipes in a gas turbine engine to prevent or substantially reduce bowed rotor conditions. The heat pipes need not be cylindrical and can take a number of arbitrary shapes to align with installation geometry around and/or through the gas turbine engine. The heat pipes can circulate a two-phase working fluid such as glycol, water, alcohol, refrigerant, or a mixture thereof. Generally, the working fluid is heated and changes phase from a liquid to a vapor. The vapor condenses into liquid as cooling occurs, and the liquid returns to be heated. A wicking structure, such as a sintered wick, a mesh wick, a grooved wick or a combination thereof, can be used to guide fluid flow within one or more heat pipes. The material selected for the body of the heat pipes and the wicking structure can depend on expected temperature range, desired structural properties, installation/servicing constraints, and other such factors.

Figure 1:
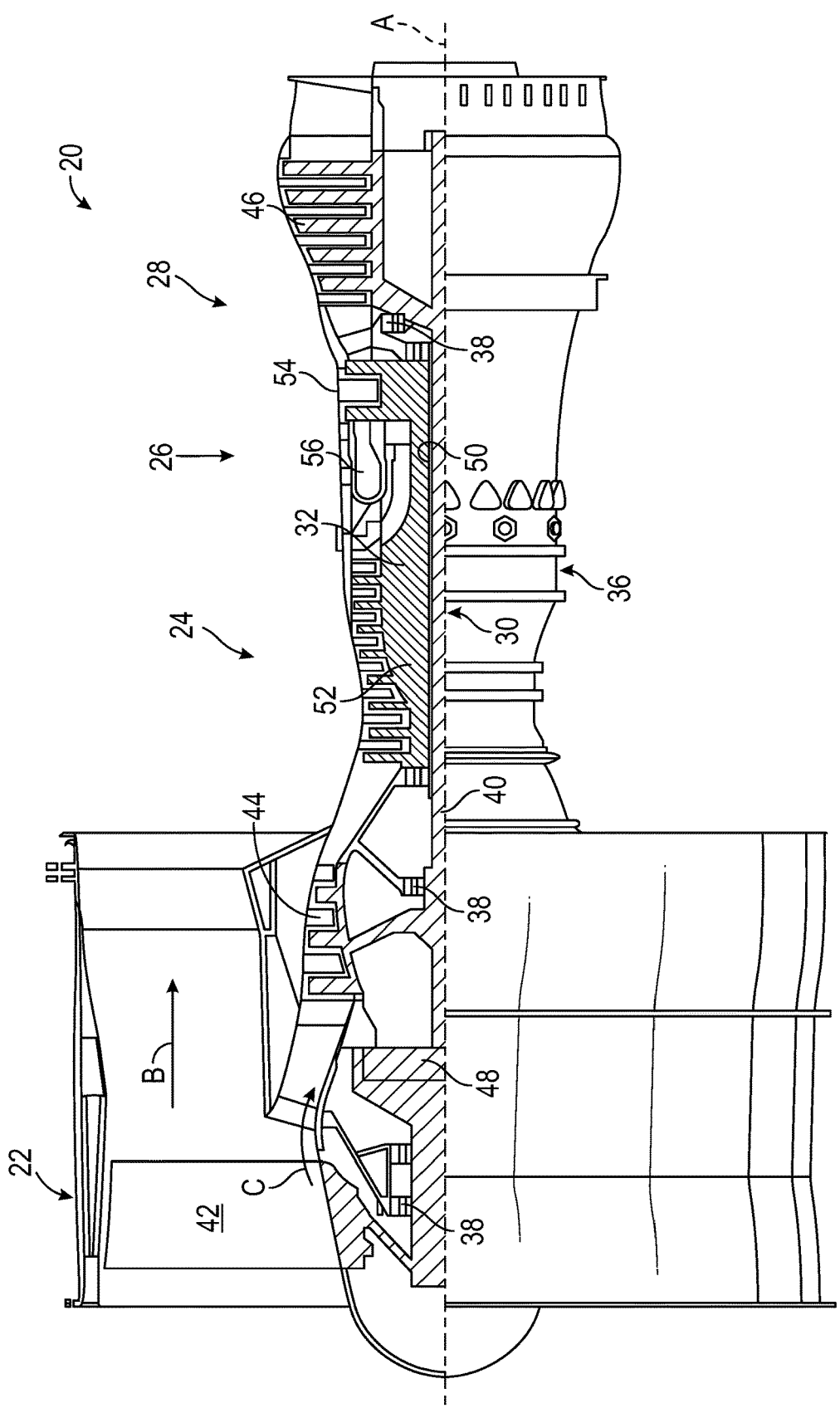
FIG. 1 is a cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 (which may also be referred to as starting spool 32) includes an outer shaft 50 (also referred to as rotor shaft 50) that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Various embodiments of the present disclosure are related to a bowed rotor start avoidance system in a gas turbine engine, such as the gas turbine engine 20 of FIG. 1. A rotor section 55 of the gas turbine engine 20 is subject to bowing effects due to thermal differences at engine shutdown. In embodiments, a heat pipe system (e.g., one or more of heat pipe systems 200-700 of FIGS. 2-7) can be installed between an upper portion 102 of the rotor section 55 and a lower portion 104 of the rotor section 55 to reduce a thermal differential between the upper portion 102 and the lower portion 104 at engine shutdown as further described herein. The rotor section 55 can be a portion of the high pressure compressor 52 of the compressor section 24 proximate to the combustor section 26. In embodiments where bowing effects can cause rubbing in the high pressure turbine 54, the rotor section 55 as described herein can also or alternatively include a portion of the high pressure turbine 54.

Figure 2:
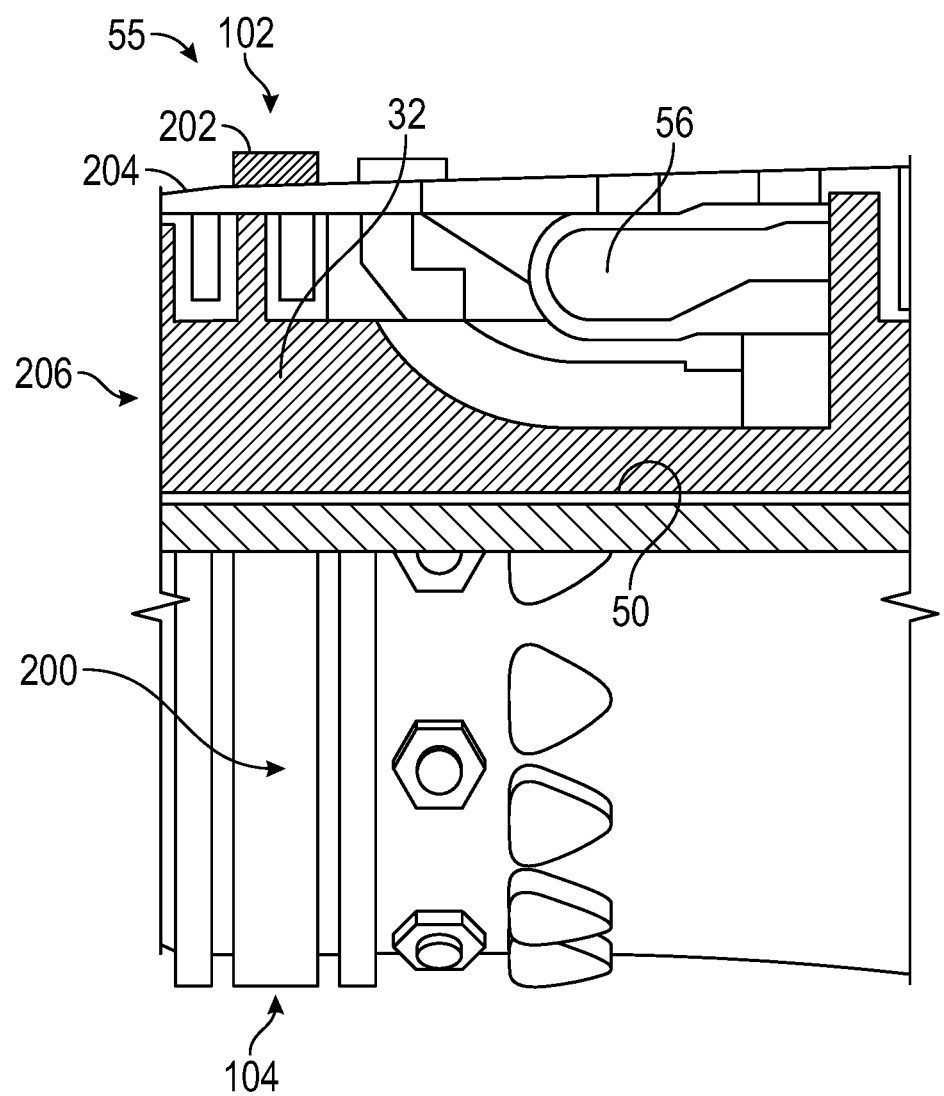
FIG. 2 is a partial view of a heat pipe system installed at a rotor section of the gas turbine engine of FIG. 1 in accordance with an embodiment of the disclosure.

FIG. 2 is a partial view of a heat pipe system 200 installed at the rotor section 55 of the gas turbine engine 20 of FIG. 1. The heat pipe system 200 can include one or more heat pipes 202 installed between the upper portion 102 of the rotor section 55 and the lower portion 104 of the rotor section 55. The heat pipe system 200 can include one or more heat pipes 202 coupled to a casing 204 of the gas turbine engine 20 and/or within an interior portion 206 of the rotor section 55. One or more heat pipes 202 can extend axially relative to the engine central longitudinal axis A of FIG. 1 and may be integrated with other thermal management components (not depicted). For example, heat can be routed toward cooler portions of the gas turbine engine 20 after shutdown, which may include both physically lower locations and axially offset locations, e.g., toward fan section 22.

Figure 3:
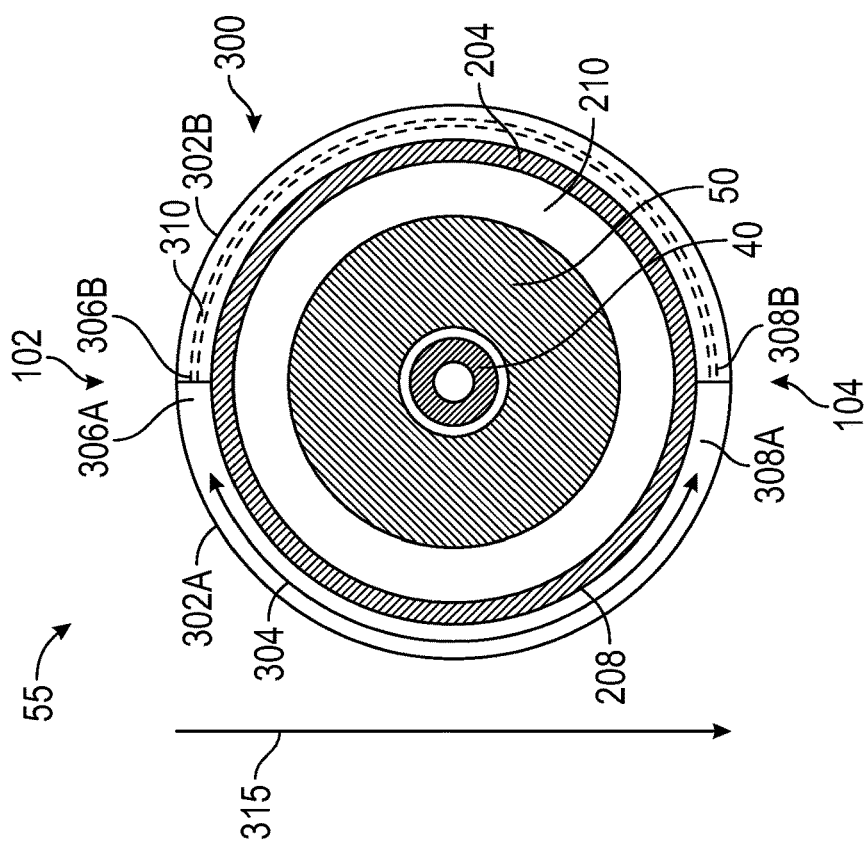
FIG. 3 depicts a schematic view of a heat pipe system coupled to a casing of a gas turbine engine in accordance with an embodiment of the disclosure.

FIG. 3 depicts a schematic view of a heat pipe system 300 coupled to the casing 204 of the gas turbine engine 20 of FIG. 1 as an embodiment of the heat pipe system 200 of FIG. 2. One or more heat pipes of the heat pipe system 300 can include one or more arcuate heat pipe segments 302A, 302B conforming to an outer diameter 208 of the casing 204 between the upper portion 102 and lower portion 104 of the rotor section 55. The heat pipe system 300 can be bonded to the casing 204, for instance, by brazing, welding, integrally forming, and/or other coupling techniques. A heat pipe fluid 304 within the arcuate heat pipe segments 302A, 302B can be in an evaporated or supercritical state during engine operation and transitions to a saturated liquid-vapor state in response to temperature non-uniformity after engine shutdown. The arcuate heat pipe segments 302A, 302B can be designed to withstand the high temperature and internal pressure of the heat pipe fluid 304 during engine operation but need not perform heat transfer until after engine shutdown. The heat pipe fluid 304 can be selected based on the anticipated performance characteristics and expected conditions at engine shutdown when flow through gas path 210 (e.g., through blades and/or vanes of the rotor section 55) ceases to be driven to the combustor section 56 of FIG. 1.

Efficient heat transfer within the heat pipe fluid 304 between a hot side 306A, 306B (e.g., evaporator section) and a cold side 308A, 308B (e.g., condenser section) of respective arcuate heat pipe segments 302A, 302B establishes a thermal communication path 315 from the upper portion 102 (e.g., 12 o'clock position) and the lower portion 104 (e.g., 6 o'clock position) of rotor section 55. In the example of FIG. 3, the arcuate heat pipe segments 302A, 302B are non-rotating components.

Each of the arcuate heat pipe segments 302A, 302B can include a wicking structure 310 (partially depicted in arcuate heat pipe segment 302B) to passively guide the flow of the heat pipe fluid 304 (schematically depicted in arcuate heat pipe segment 302A), for instance, through capillary effects between respective cold sides 308A, 308B and hot sides 306A, 306B. The wicking structure 310 can be substantially arcuate to match an internal volume of each of the arcuate heat pipe segments 302A, 302B. The exact geometry of the wicking structure 310 may include grooves, a porous sintered structure, and/or other features that can be selected and designed to maximize thermal transport of the heat pipe during the conditions shortly after engine shutdown. In the example of FIG. 3, the heat pipe fluid 304 is isolated in each of the arcuate heat pipe segments 302A, 302B.

Thus, as heat stored in components of the rotor section 55 convects and radiates upward after rotation of the inner shaft 40 and outer shaft 50 ceases, the heat pipe system 300 accepts heat at the hot side 306A, 306B of heat pipe system 300 at the upper portion 102, flows heat from the hot side 306A, 306B to the cold side 308A, 308B of the heat pipe system 300, and rejects heat to the cold side 308A, 308B at the lower portion 104 to reduce a thermal differential between the upper portion 102 and the lower portion 104 at engine shutdown.

Figure 4:
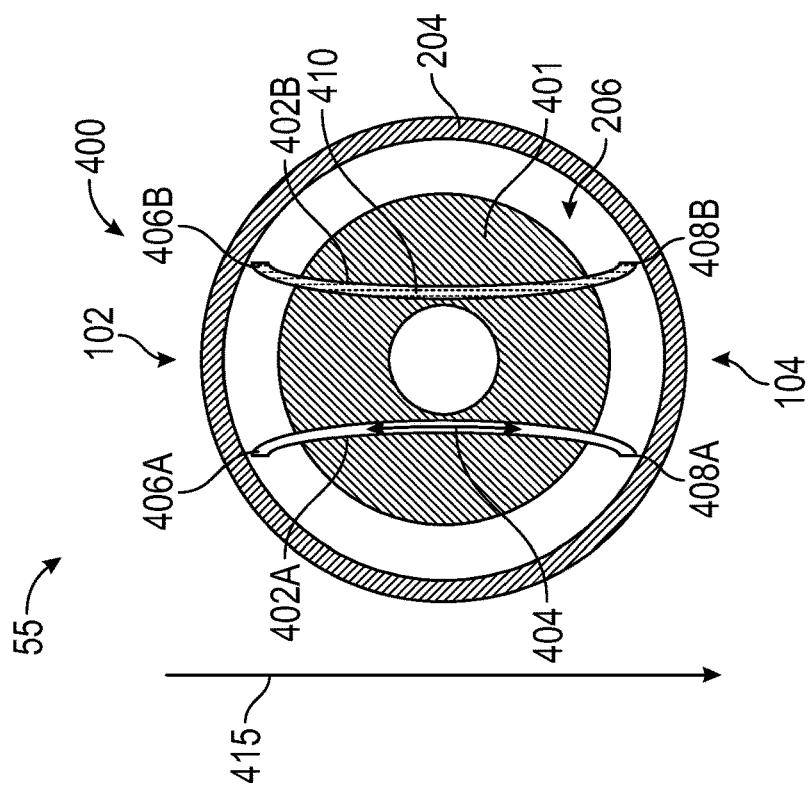
FIG. 4 depicts a schematic view of a heat pipe system installed in a rotating component of a gas turbine engine in accordance with an embodiment of the disclosure.

FIG. 4 depicts a schematic view of a heat pipe system 400 installed in a rotating component 401 in the interior portion 206 of the rotor section 55 of the gas turbine engine 20 of FIG. 1 in accordance with an embodiment. The heat pipe system 400 is another embodiment of the heat pipe system 200 of FIG. 2. One or more heat pipes 402A, 402B of the heat pipe system 400 can rotate with rotating component 401 but need not perform heat transfer until rotation ceases. Various geometries are contemplated within embodiments to effectively flow heat by the heat pipes 402A, 402B between the upper portion 102 and the lower portion 104 through the interior portion 206. While two heat pipes 402A, 402B are depicted in FIG. 4, it will be understood that the heat pipe system 400 can include any number of heat pipes 402. A plurality of heat pipes 402 can be installed at different angles so that no matter what position the rotating spool comes to rest at, there will be at least one heat pipe in a substantially vertical orientation between the upper portion 102 and the lower portion 104. As one example, multiple instances of heat pipes 402A and 402B can be incorporated at axially spaced intervals with different angular offsets between groups of heat pipes 402A and 402B. Similar to the heat pipe system 300 of FIG. 3, a heat pipe fluid 404 can be entrained within the heat pipes 402A, 402B in an evaporated or supercritical state during engine operation and transitions to a saturated liquid-vapor state in response to temperature non-uniformity after engine shutdown. The heat pipes 402A, 402B can be designed to withstand the high temperature and internal pressure of the heat pipe fluid 404 during engine operation but need not perform heat transfer until after engine shutdown. Heat transfer within the heat pipe fluid 404 between a hot side 406A, 406B (e.g., evaporator section) and a cold side 408A, 408B (e.g., condenser section) of respective heat pipes 402A, 402B establishes a thermal communication path 415 from the upper portion 102 and the lower portion 104 of rotor section 55 through interior portion 206.

Heat pipes 402A, 402B can include a wicking structure 410 (partially depicted in heat pipe 402B) to passively guide the flow of the heat pipe fluid 404 (schematically depicted in heat pipe 402A), for instance, through capillary effects between respective cold sides 408A, 408B and hot sides 406A, 406B. The wicking structure 410 can be shaped to substantially match an internal volume of each of the heat pipes 402A, 402B. The exact geometry of the wicking structure 410 may include grooves, a porous sintered structure, and/or other features that can be selected and designed to maximize thermal transport of the heat pipe during the conditions shortly after engine shutdown. In the example of FIG. 4, the heat pipe fluid 404 is isolated in each of the heat pipes 402A, 402B.

Figure 5:
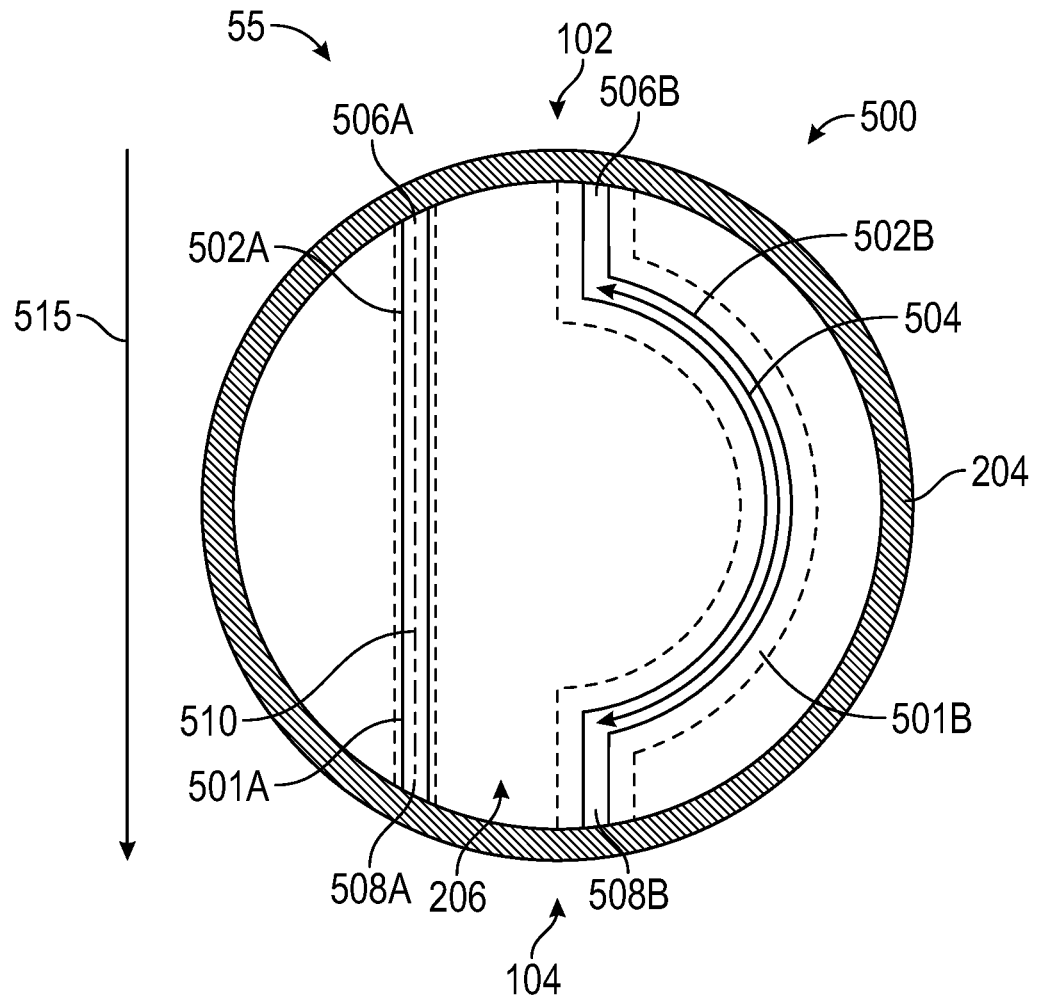
FIG. 5 depicts a schematic view of a heat pipe system installed in one or more non-rotating components of a gas turbine engine in accordance with another embodiment of the disclosure.

FIG. 5 depicts a schematic view of a heat pipe system 500 installed in one or more non-rotating components 501A, 501B in the interior portion 206 of the rotor section 55 of a gas turbine engine 20 in accordance with another embodiment. The non-rotating components 501A, 501B can have various geometries, for example, support structures with linear and/or non-linear shapes that extend between the upper portion 102 and the lower portion 104 through the interior portion 206. One or more heat pipes 502A, 502B of the heat pipe system 500 can be shaped and sized (e.g., various lengths, diameter, and curvature) to match the non-rotating components 501A, 501B into which the heat pipes 502A, 502B are embedded or otherwise coupled. While two heat pipes 502A, 502B are depicted in FIG. 5, it will be understood that the heat pipe system 500 can include any number of heat pipes 502. Similar to the heat pipe system 300 of FIG. 3, a heat pipe fluid 504 can be entrained within the heat pipes 502A, 502B in an evaporated or supercritical state during engine operation and transitions to a saturated liquid-vapor state in response to temperature non-uniformity after engine shutdown. The heat pipes 502A, 502B can be designed to withstand the high temperature and internal pressure of the heat pipe fluid 504 during engine operation but need not perform heat transfer until after engine shutdown. Heat transfer within the heat pipe fluid 504 between a hot side 506A, 506B (e.g., evaporator section) and a cold side 508A, 508B (e.g., condenser section) of respective heat pipes 502A, 502B establishes a thermal communication path 515 from the upper portion 102 and the lower portion 104 of rotor section 55 through interior portion 206.

Heat pipes 502A, 502B can include a wicking structure 510 (partially depicted in heat pipe 502A) to passively guide the flow of the heat pipe fluid 504 (schematically depicted in heat pipe 502B), for instance, through capillary effects between respective cold sides 508A, 508B and hot sides 506A, 506B. The wicking structure 510 can be substantially shaped to match an internal volume of each of the heat pipes 502A, 502B. The exact geometry of the wicking structure 510 may include grooves, a porous sintered structure, and/or other features that can be selected and designed to maximize thermal transport of the heat pipe during the conditions shortly after engine shutdown. In the example of FIG. 5, the heat pipe fluid 504 is isolated in each of the heat pipes 502A, 502B.

Figure 6:
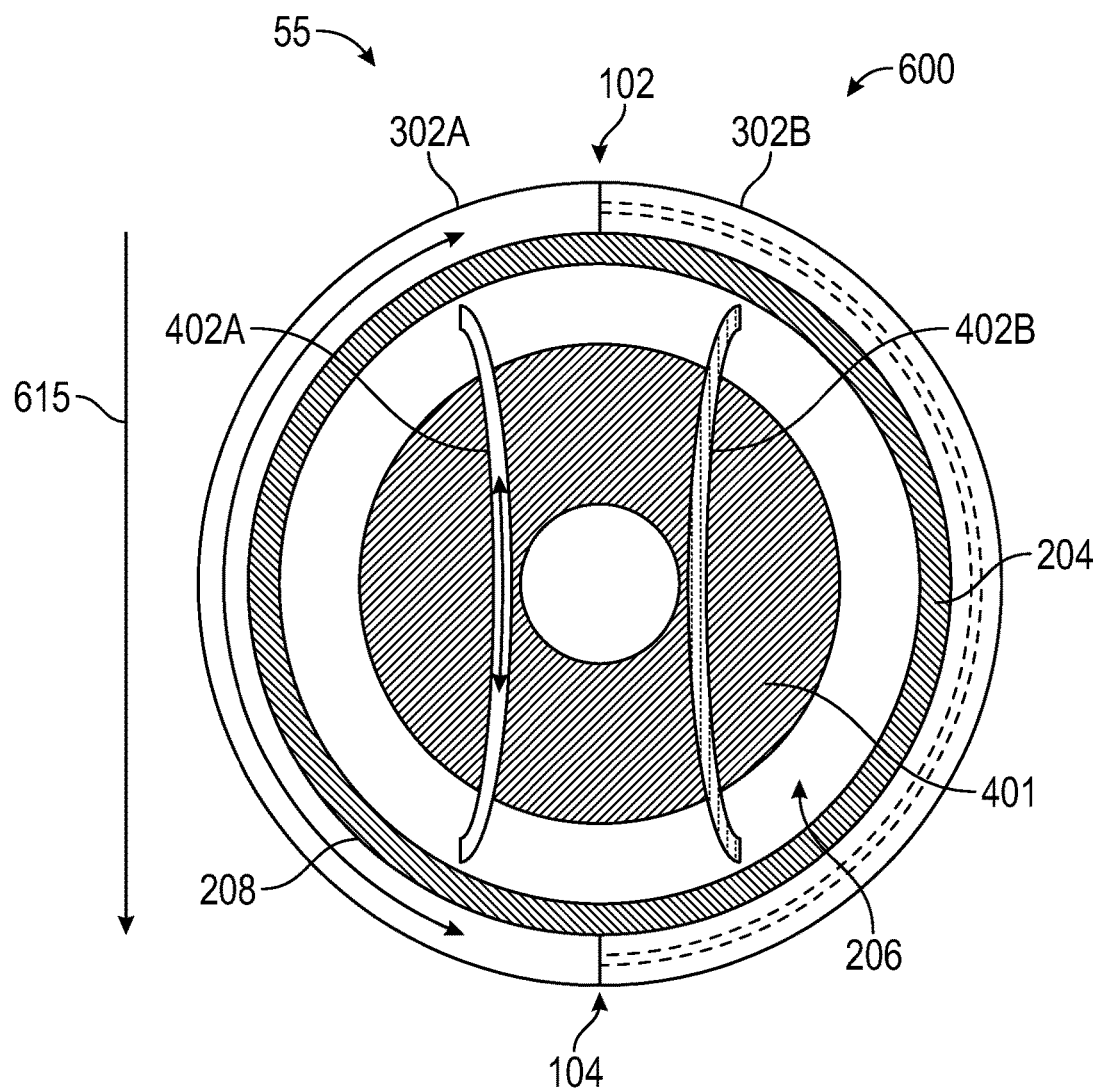
FIG. 6 depicts a schematic view of a heat pipe system coupled to a casing of a gas turbine engine and installed in a rotating component of the gas turbine engine in accordance with an embodiment of the disclosure.

FIG. 6 depicts a schematic view of a heat pipe system 600 coupled to the casing 204 and installed in a rotating component 401 in the interior portion 206 of the rotor section 55 of the gas turbine engine 20 of FIG. 1 in accordance with an embodiment. In the example of FIG. 6, a thermal communication path 615 from the upper portion 102 and the lower portion 104 of rotor section 55 is formed both along the outer diameter 208 of the casing 204 and through interior portion 206 using a combination of the one or more arcuate heat pipe segments 302A, 302B and the one or more heat pipes 402A, 402B. The heat pipe system 600 can further enhance thermal normalization between the upper portion 102 and the lower portion 104 using interior and exterior heat flow through and around the gas turbine engine 20 of FIG. 1.

Figure 7:
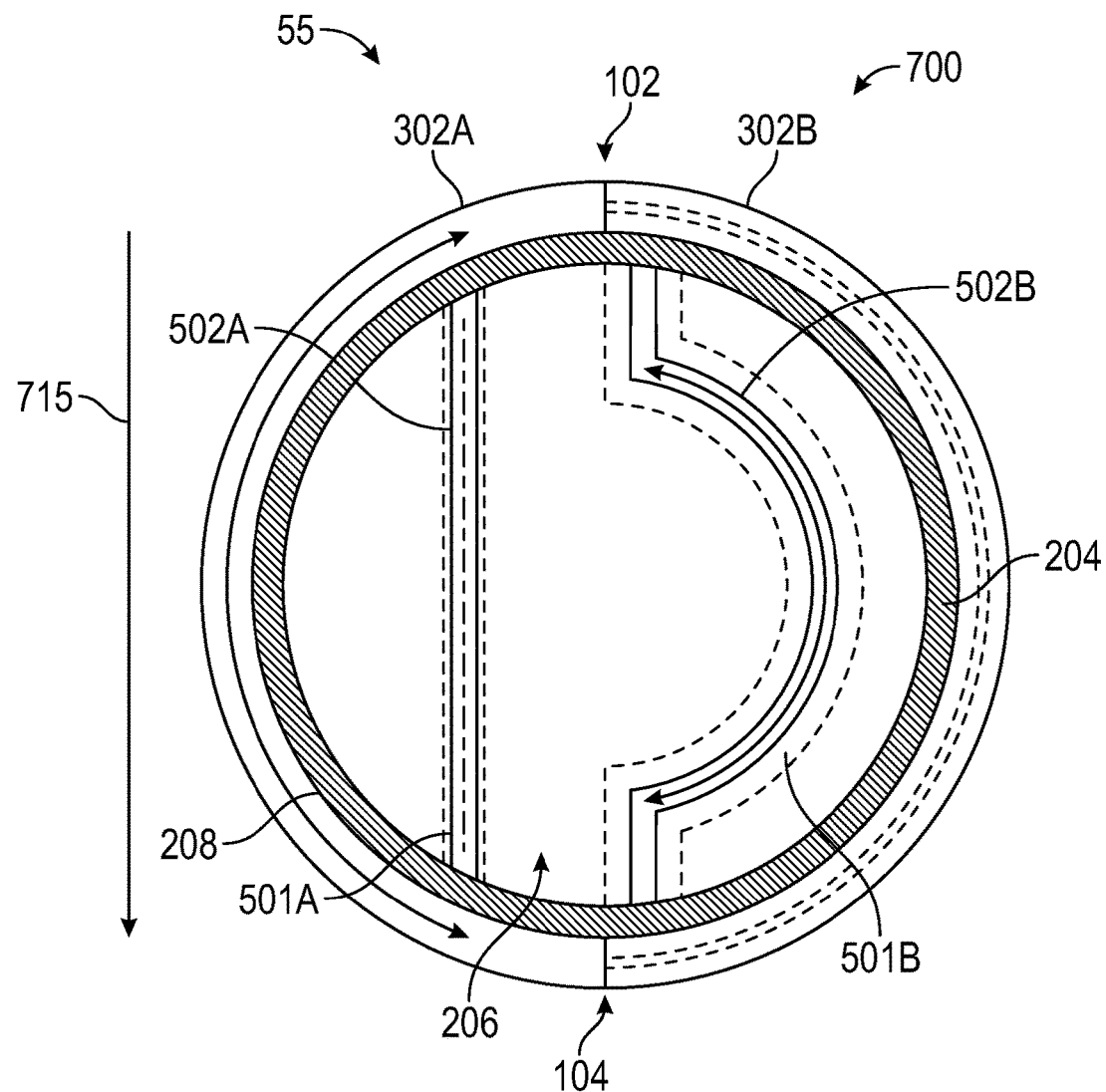
FIG. 7 depicts a schematic view of a heat pipe system coupled to a casing of a gas turbine engine and installed in one or more non-rotating components of the gas turbine engine in accordance with an embodiment of the disclosure.

FIG. 7 depicts a schematic view of a heat pipe system 700 coupled to the casing 204 and installed in one or more non-rotating components 501A, 501B in the interior portion 206 of the rotor section 55 of the gas turbine engine 20 of FIG. 1 in accordance with an embodiment. In the example of FIG. 7, a thermal communication path 715 from the upper portion 102 and the lower portion 104 of rotor section 55 is formed both along the outer diameter 208 of the casing 204 and through interior portion 206 using a combination of the one or more arcuate heat pipe segments 302A, 302B and the one or more heat pipes 502A, 502B. The heat pipe system 700 can further enhance thermal normalization between the upper portion 102 and the lower portion 104 using interior and exterior heat flow through and around the gas turbine engine 20 of FIG. 1. Further combinations will be apparent to one skilled in the art, such as combining elements of the heat pipe systems 200, 300, and 400; combining the elements of heat pipe systems 300 and 400; and/or inclusion of additional heat transfer features (not depicted).

Figure 8:
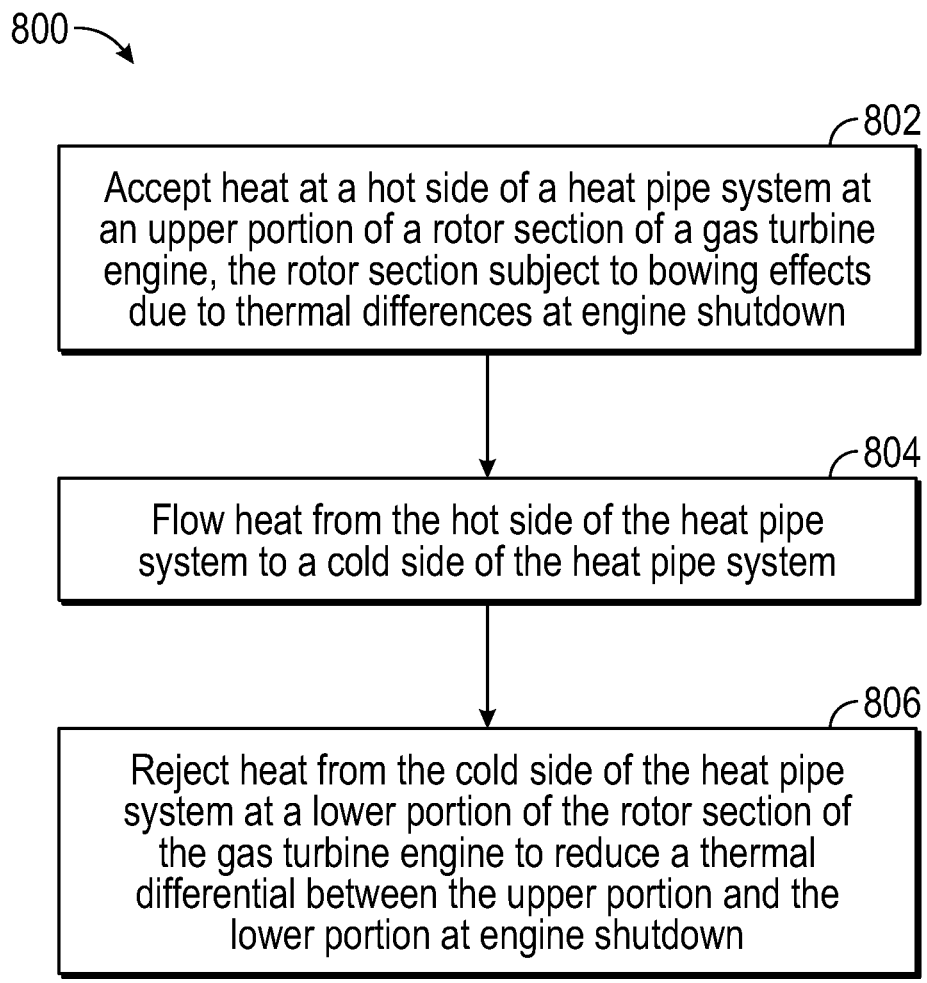
FIG. 8 is a flow chart illustrating a method in accordance with an embodiment of the disclosure.

FIG. 8 is a flow chart illustrating a method 800 for bowed rotor avoidance in the gas turbine engine 20 of FIG. 1 in accordance with an embodiment. The method 800 of FIG. 8 is described in reference to FIGS. 1-7 and may be performed with an alternate order and include additional steps.

At block 802, heat is accepted at a hot side of a heat pipe system (such as at hot side 306, 406, 506 of heat pipe systems 300, 400, 500) at an upper portion 102 of a rotor section 55 of the gas turbine engine 20, where the rotor section 55 is subject to bowing effects due to thermal differences and heat transfer at engine shutdown, and the heat pipe system includes one or more heat pipes (such as heat pipes 302, 402, 502 of. heat pipe systems 300, 400, 500). A heat pipe fluid 304, 404, 504 can accept and flow heat within respective heat pipe systems 300, 400, 500.

At block 804, heat flows from the hot side of the heat pipe system (such as at hot side 306, 406, 506 of heat pipe systems 300, 400, 500) to a cold side of the heat pipe system (such as at cold side 308, 408, 508 of heat pipe systems 300, 400, 500). At least one of the one or more heat pipes (such as arcuate heat pipe segments 302A, 302B) can be coupled to the casing 204 of the gas turbine engine 20 that surrounds the rotor section 55 spanning an outer diameter 208 of the casing 204 between the upper portion 102 and the lower portion 104 and flowing heat across the outer diameter 208 of the casing 204. At least one of the one or more heat pipes (such as heat pipes 402) can be installed in a rotating component 401 of an interior portion 206 of the rotor section 55 and can flow heat through the rotating component 401. At least one of the one or more heat pipes (such as heat pipes 502) can be installed in a non-rotating component 501 of the interior portion 206 and can flow heat through the non-rotating component 501.

At block 806, heat can be rejected from the cold side of the heat pipe system (such as at cold side 308, 408, 508 of heat pipe systems 300, 400, 500) at a lower portion 104 of the rotor section 55 of the gas turbine engine 20 to reduce a thermal differential between the upper portion 102 and the lower portion 104 at engine shutdown.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A gas turbine engine comprising:
    a rotor section proximate to a combustor section, wherein the rotor section is subject to bowing effects due to thermal differences and heat transfer at engine shutdown; and
    a heat pipe system comprising one or more heat pipes installed between an upper portion of the rotor section and a lower portion of the rotor section, the heat pipe system operable to accept heat at a hot side of the heat pipe system at the upper portion, flow heat from the hot side to a cold side of the heat pipe system, and reject heat from the cold side of the heat pipe system at the lower portion to reduce a thermal differential between the upper portion and the lower portion at engine shutdown, wherein at least one of the one or more heat pipes is coupled to a casing that surrounds the rotor section and spans an outer diameter of the casing between the upper portion and the lower portion, and at least one of the one or more heat pipes passes through an interior portion of the rotor section.

2. The gas turbine engine as in claim 1, further comprising a compressor section and a turbine section proximate to the combustor section, wherein the rotor section comprises a portion of a high pressure compressor of the compressor section proximate to the combustor section.

3. The gas turbine engine as in claim 1, wherein at least one of the one or more heat pipes is coupled to a casing of the gas turbine engine.

4. The gas turbine engine as in claim 3, wherein the at least one of the one or more heat pipes that is coupled to the casing of the gas turbine engine spans an outer diameter of the casing between the upper portion and the lower portion.

5. The gas turbine engine as in claim 1, wherein at least one of the one or more heat pipes passes through an interior portion of the rotor section.

6. The gas turbine engine as in claim 5, wherein the at least one of the one or more heat pipes is installed in a non-rotating component of the interior portion.

7. A method for bowed rotor avoidance in a gas turbine engine, the method comprising:
    accepting heat at a hot side of a heat pipe system at an upper portion of a rotor section of a gas turbine engine, the rotor section subject to bowing effects due to thermal differences at engine shutdown, wherein the heat pipe system comprises one or more heat pipes;
    flowing heat from the hot side of the heat pipe system to a cold side of the heat pipe system; and
    rejecting heat from the cold side of the heat pipe system at a lower portion of the rotor section of the gas turbine engine to reduce a thermal differential and heat transfer between the upper portion and the lower portion at engine shutdown, wherein at least one of the one or more heat pipes is coupled to a casing that surrounds the rotor section and spans an outer diameter of the casing between the upper portion and the lower portion and flows heat across the outer diameter of the casing, and at least one of the one or more heat pipes passes through an interior portion of the rotor section and flows heat through the interior portion.

8. The method as in claim 7, wherein the gas turbine engine comprises a compressor section and a turbine section proximate to the combustor section, and the rotor section comprises a portion of a high pressure compressor of the compressor section proximate to the combustor section.

9. The method as in claim 7, wherein at least one of the one or more heat pipes is coupled to a casing of the gas turbine engine.

10. The method as in claim 9, wherein the at least one of the one or more heat pipes that is coupled to the casing of the gas turbine engine spans an outer diameter of the casing between the upper portion and the lower portion and flows heat across the outer diameter of the casing.

11. The method as in claim 7, wherein at least one of the one or more heat pipes passes through an interior portion of the rotor section and flows heat through the interior portion.

12. The method as in claim 11, wherein the at least one of the one or more heat pipes is installed in a non-rotating component of the interior portion and flow heat through the non-rotating component.

* * * * *